United States Patent [19]

Burkwall, Jr.

[11] 4,046,922

[45] * Sept. 6, 1977

[54] SHELF STABLE, SEMI-MOIST SIMULATED EGG

[75] Inventor: Morris P. Burkwall, Jr., Marengo, Ill.

[73] Assignee: The Quaker Oats Company, Chicago, Ill.

[ * ] Notice: The portion of the term of this patent subsequent to Aug. 10, 1993, has been disclaimed.

[21] Appl. No.: 686,724

[22] Filed: May 17, 1976

Related U.S. Application Data

[63] Continuation-in-part of Ser. No. 471,338, May 20, 1974, abandoned, which is a continuation-in-part of Ser. No. 234,990, March 15, 1972, abandoned.

[51] Int. Cl.$^2$ .............................................. A23L 1/32
[52] U.S. Cl. .................................. 426/104; 426/532; 426/573; 426/578; 426/614; 426/656; 426/657
[58] Field of Search ............... 426/104, 250, 330.1, 426/334, 532, 573, 585, 613, 614, 656, 657, 805, 578

[56] References Cited

U.S. PATENT DOCUMENTS

| | | | |
|---|---|---|---|
| 1,687,269 | 10/1928 | Epstein | 426/532 X |
| 3,207,609 | 9/1965 | Gorman et al. | 426/614 |
| 3,475,180 | 10/1969 | Jones | 426/614 |
| 3,640,731 | 2/1972 | Kaplow et al. | 426/532 X |
| 3,640,732 | 2/1972 | Johnson | 426/250 |
| 3,974,296 | 8/1976 | Burkwall, Jr. | 426/104 |

*Primary Examiner*—Raymond N. Jones
*Assistant Examiner*—R. A. Yoncoskie
*Attorney, Agent, or Firm*—Mathew R. P. Perrone, Jr.

[57] ABSTRACT

A shelf stable, semi-moist, simulated egg comprising specified amounts of egg solids, edible water absorbing hydrocolloid, a high protein binding agent, water, and either sugar, sugar equivalents, or mixtures thereof.

8 Claims, No Drawings

SHELF STABLE, SEMI-MOIST SIMULATED EGG

CROSS-REFERENCE TO RELATED APPLICATIONS

This application is a continuation-in-part of patent application Ser. No. 471,338 filed May 20, 1974, now abandoned, which in turn is a continuation-in-part of patent application Ser. No. 234,990 filed Mar. 15, 1972, now abandoned.

BACKGROUND OF THE INVENTION

1. Field of the Invention

This invention relates to a shelf stable, semi-moist, simulated egg product. The product is particularly suitable for human consumption but may be used as a pet food also.

2. Description of the Prior Art

Many attempts have been made to produce a shelf stable simulated egg product. These products have not been successful. For one thing, there has not been a semi-moist simultated egg product which would retain its characteristics and yet be free from bacteriological degradation. Other things contributing to prior art failures have been change in color and rancidity, if an attempt was made to preserve the product other than by aseptic canning. The product herein claimed overcomes the inefficiencies of the prior art and provides a stable, pleasant tasting simulated egg product.

SUMMARY OF THE INVENTION

It is an object of this invention to provide a shelf stable, semi-moist simulated egg product which is shelf stable at room temperature for at least 6 months.

It is another object of this invention to provide a shelf stable, semi-moist, high protein containing, simulated egg product.

It is still another object of this invention to provide a process for producing a shelf stable, semi-moist, simulated egg product.

The objects of this invention are accomplished by a simulated egg comprising from about 1 to about 35 percent by weight of a member selected from the group consisting essentially of sugar, sugar equivalents, and mixtures thereof; from 1 to 30 percent by weight edible water absorbing hydrocolloid; from 10 to 50 percent by weight of a high protein binding agent; and sufficient water to give a final moisture content of from 20 to 40 percent by weight; wherein the total weight percentage is equal to 100 percent; and wherein the pH of the product is from 4.5 to 6.9.

The objects of this invention are further accomplished by a simulated egg comprising from about 1 to about 35 percent by weight of egg solids; from about 5 to about 35 percent by weight of a member selected from the group consisting essentially of sugar, sugar equivalents, and mixtures thereof; from 1 to 30 percent by weight edible water absorbing hydrocolloid from 10 to 30 percent by weight of a high protein binding agent; and sufficient water to give a final moisture content of from 20 to 40 percent by weight; wherein the total weight percentage of the product is 100 percent; and wherein the pH of the product is from 4.5 to 6.9; and wherein the product is shaped in the form of a rounded disc having an inner yellow-colored portion and an outer white-colored portion.

It is preferred that the simulated egg of this invention also contain from 1 to 7 percent by weight of an edible oil.

In the process for producing this new and novel simulated egg it is also preferred to heat the mixture to a temperature of from about 150° to about 230° F. and thereafter form the product in a rounded disc as a fried egg shape or subdivide it in small strands to give it a scrambled egg shape.

The shelf table, semi-moist simulated egg of this invention includes from about 1 to about 35 percent by weight egg solids. By use herein of the term "egg solids" I intend to mean egg solids as they are known to the art and as they are now presently commercially available from the many various sources. Within the term "egg solids" I intend to mean dried whole egg solids having approximately 45 percent protein and approximately 42 percent fat, dried egg yolk having approximately 31 percent protein and approximately 61 percent fat; and dried egg white having approximately 86 percent protein and substantially free of fat. I also intend to include frozen eggs, frozen egg whites, frozen egg yolks and/or combinations thereof as long as the moisture content thereof does not cause the moisture of the final product to exceed the stated critical ranges.

The simulated egg of this invention must include from about 5 to about 35 percent by weight of a member selected from the group consisting essentially of sugar, sugar equivalents, and mixtures thereof. By use herein of the term "sugar" I intend to mean any saccharide which is soluble in water to an extent that the osmotic pressure of a water solution of such a saccharide will provide the requisite bacteriostatic effect. In addition, the saccharide is required to be nontoxic. The saccharide must not provide any undesirable taste effects when used in the required concentration. It is preferred that the sugar be a low molecular weight sugar since sugars of a lower molecular weight have a more pronounced effect in increasing the osmotic pressure of a sugar solution than do sugars of a high molecular weight. Among the sugars that may be used for this invention are the reducing and nonreducing water soluble monosaccharides; the reducing and nonreducing polysaccharides and their degradation products such as pentoses, aldopentoses, methylpentoses, ketopentoses, e.g., xylose and arabinose; rhamnose; hexoses and reducing polysaccharides; aldo hexoses like glucose, galactose and mannose; the ketohexoses including fructose and sorbose; the disaccharides including maltose and lactose; the nonreducing disaccharides such as sucrose; and other polysaccharides such as dextrin and raffinose and hydrolyzed starches which contain as their constituents oligosaccharides.

By use of the term "sugar equivalents" I intend to mean a compound which can be added to the mixture to produce the same effect on osmotic pressure as would sugar. Generally the sugar equivalents include the polyhydric alcohols which are nontoxic and which do not adversely affect the taste in the concentrations specified. By the term "polyhydric alcohols" I generally intend to mean alcohols with three or more hydroxyl groups and having the general formula $HOCH_2(CHOH)_mCH_2OH$ where $m$ is a number from 1-5. I also intend to cover as a polyhydric alcohol, 1,3-butylene glycol and propylene glycol. Generally, these polyhydric alcohols are water soluble, have small optical rotation in water and have some sweetness to taste. Among the polyhydric alcohols that may be used in this invention are the following:

Tritols
  glycerol
tetritols
  erythritol
  D-threitol
  L-thrietol
  D,L-threitol
pentitols
  ribitol
  xylitol
  D-arabitol
  L-arabitol
hexitols
  allitol
  dulcitol
  sorbitol (D-glucitol)
  L-glucitol
  D,L-glucitol
  D-mannitol
  L-mannitol
  D,L-mannitol
  D-talitol
  L-talitol
  D,L-talitol
  D-iditol
  L-iditol
heptitols
  glycero-gluo-heptitol
  D-glycero-D-ido-heptitol
  perseitol
  volemitol
octitol
  D-erythro-D-galacto-octitol The term sugar equivalent also includes the higher sugar alcohols. Glycerol and propylene glycol are acceptable "sugar equivalents" and are particularly useful in this invention. As used herein, the product should contain sugar or sugar equivalents or mixtures thereof. When using mixtures of the sugar and sugar equivalents, care must be taken to insure that the amount used reduces the osmotic pressure of the product to the extent that it imparts therein a bacteriostatic effect.

The product of this invention must contain from 1 to 30 percent by weight edible water absorbing hydrocolloid and preferably from 2 to 28 percent by weight.

By use herein of the term "edible water absorbing hydrocolloid," it is intended to mean a hydrocolloid which can absorb from at least one to 20 times its weight in water. It includes starches, polysaccharide gums, pectin and other gelling agents.

By use of the term starch, it is intended to mean both modified and unmodified starch, both waxy and non-waxy starch, both regular and high amylose starch, and both grain and tuber starch. The starch can be acid treated or oxidized to make it thin boiling. It can be pregelatinized prior to inclusion in the process or ungelatinized when added and then gelatinized in the process. It can be cross-linked with a cross-linking agent such as sodium trimeta phosphate, epichlorohydrin, phosphorousoxichloride, or alkalating agents such as propylene oxide or acelating agents such as acetic anhydride.

Any of the common commercial starches are acceptable for use in this invention. I have found it particularly acceptable to use a pregelatinized tapioca starch, but this invention is not limited to tapioca as the only type of starch since other types of starch such as corn starch, wheat starch, waxy maize starch, etc., are also acceptable as well as the starch containing flours and meals.

By use of the term "gelatinized" with reference to the starch, I intend to mean starch that is gelatinized prior to addition to the mix or else is partly or slightly gelatinized prior to addition to the mix and then gelatinized by the processing conditions. I may also use ungelatinized starch that is gelatinized in the process in a time sufficient to impart the properties achieved by pregalatinized starch.

By use of the term "polysaccharide gum" it is intended to include both true gums of vegetable origin and synthetic gums such as carboxymethylcellulose, methyl cellulose, and other cellulose derivatives which approximate the vegetable gums in physical and chemical properties. Both types of gums are acceptable for use in this invention.

"True gums" are gums of vegetable origin which are soluble in water or swell in contact with water to form viscuous colloidal solutions. They are insoluble in oils, alcohol, benzene and other organic solvents.

A general classification of such gums is as follows:

A. Plant gums—dried extrudates from certain trees or shrubs in the form of tears, flakes or annular fragments that have been formed by bark fissures or incisions. The more important ones include acacia (gum arabic). Australian, Cape, carmania, gedda, ghatti, karaya, mesquite, mogadore, Persian, shiraz, talha, and tragacanth. Others of lesser importance include amrad, angico, apricot, brea, cashew, cebil, cedar, chagual, cherry, damson, jeol, mango, plum and sassa.

B. Plant mucilages—derived from seeds, roots or other plant parts usually by extraction with water. The class includes gums derived from althea root, chia seed, Iceland moss, linseed (flaxseed), slippery elm bark and guar gum.

C. Mucilaginous materials known as hydrophylic colloids obtained from two general groups of brown and red algae. This class includes agar, Irish moss (carrageen) and algin.

When the source material for the gum is acidic, i.e., algin and Irish moss, the commercially available edible gum is a derivative of the acid such as a soluble salt or ester, i.e., propylene glycol ester of alginic acid in general, to be satisfactory, any gum employed must be edible, have no undesirable flavor, and disperse rapidly in hot water.

This invention also includes the use of such gelling agents as pectin.

Contributing to the stability of the shelf stable, semi-moist, simulated egg of this invention is at least one antimycotic in a sufficient amount to prevent mold and otherwise render the product stable. The antimycotic is customarily present in amounts 0.01 to 0.5 percent by weight. More preferably the antimycotic is present in amounts from 0.01 percent to 0.3 percent by weight. Potassium sorbate is a preferred antimycotic. Other suitable antimycotics include benzoic acid, sodium benzoate, propionic and sodium and calcium proprionate, ethyl and propyl paraben, sorbic acid, sodium sorbate and calcium sorbate. The antimycotic above-mentioned, sugar and sugar equivalents, and below mentioned acid combine to provide stability for the shelf stable, semi-moist, simulated egg of this invention.

The shelf stable, semi-moist simulated egg of this invention also includes from 10 to 30 percent by weight of a high protein binding agent. The high protein binding agent should have a protein content which when combined with the protein content of the other ingredients, provides at least from about 10 to 30 percent by weight, and preferably from 15 to 25 percent by weight protein in the finished product. It is generally preferred to use as a binding agent a soybean flour, which has been concentrated to provide in the flour at least 50 percent by weight protein. I also find it particularly acceptable to use soy protein concentrates (70 percent protein) and soy protein isolates (90 percent protein). Any of the known high protein binding agents may be used in place of the soy flour, however, including such things as casein, caseinate salts, albumin, and whey. Also acceptable as protein binding agents are non-fat milk solids, cereal proteins such as wheat gluten and corn zein, and the common oilseed proteins.

The simulated egg of this invention contains from 20 to 40 percent by weight water as a final moisture content. Although the water content of this product would generally be expected to result in serious bacterial problems, this has been essentially eliminated by the use herein of the sugar, sugar equivalents, and mixtures thereof with acid, and antimycotic to provide a bacteriostatic effect.

The product of this invention must have a pH of from 4.5 to 6.9. The pH of the product may be adjusted to this level by adding therein any edible food grade, non-toxic acid which can adjust the H+ ion concentration to the desired level. Examples of suitable pH adjusters are lactic acid, citric acid, acetic acid, tartaric acid, hydrochloric acid, sulfuric acid, phosphoric acid, and acid salts such as monobasic sodium phosphate. Both organic and inorganic acids may be used as well as mixtures of the two types of acids. It is critical that the pH of the product fall within the required pH range.

In addition to the fat that is already present in the ingredients, it may be desirable to add an additional 1 to 7 percent by weight of an edible fat or oil to increase the fat content of the product. The term "edible fat or oil" as used herein refers to the common usage of the term including those that are solid and those that are liquid at room temperature.

The process for producing my new and unique simulated egg comprises mixing from about 1 to about 35 percent by weight egg solids; from about 5 to about 35 percent by weight of a member selected from the group consisting essentially of sugar, sugar equivalents and mixtures thereof; from 1 to 30 percent by weight gelatinized starch; from 10 to 50 percent by weight of a high protein binding agent; and sufficient water to bring the final moisture content from 20 to 40 percent by weight; and forming the mixture into the shape of either a fried egg or subdivide it to resemble scrambled eggs. In preparing this product it is essential that the mixing of the ingredients be sufficiently thorough so that each of the ingredients will be uniformly distributed throughout the product. The mixture can then be formed into any desired egg shape.

I have found it is particularly acceptable to produce a shelf stable, semi-moist simulated egg by mixing the ingredients together, heating the mixture to a temperature of from about 150° to about 230° F. and thereafter forming the mixture by extruding it. It may be extruded in a flat shape and cut to give the appearance of a fried egg. I have also found it acceptable to form the product by extruding it into small strands. While higher extrusion temperatures may be used to give an acceptable product, such is not the preferred conditions since the higher temperatures tend to cause a loss of the volatile aroma and flavor components.

It is to be understood that for commercial applications, the product of this invention may include minimum amounts of vitamins, minerals, salts, artificial color and artificial flavor for the obvious reasons.

It is to be understood that in certain applications of this invention, it is necessary to utilize a food grade edible, non-toxic coloring material to provide a yellow color to simulate an egg yoke and a white color to simulate an egg white. The choice and amount of these colors is dependent upon the mixture prepared and the extent to which it needs to be colored. For instance, if the mixture is a white color then only one portion needs to be colored yellow to simulate the egg yolk and the remainder can remain as is to simulate the egg white. Likewise, it the color is yellowish, a portion thereof needs to be in some way whitened to simulate an egg white and the remaining portion can be left yellow to simulate egg yolk.

DESCRIPTION OF THE PREFERRED EMBODIMENTS

The following examples may be taken to constitute the preferred embodiments of this invention although the invention is not limited to the embodiments illustrated.

EXAMPLE 1

The following ingredients were admixed:

| | (parts refers to parts by weight) |
|---|---|
| 5.0 | parts whole egg solids |
| 20.0 | parts sugar and sugar equivalent (15 parts sucrose and 5 parts propylene glycol) |
| 18.0 | parts pregelatinized tapioca starch |
| 24.0 | parts high protein binding agent (10 parts of a 50 percent protein soy flour 8 parts of a 70 percent protein soy concentrate 5 parts of a sodium caseinate 1 parts dryed whey) |
| 4.0 | parts salts, vitamins, minerals, and artificial coloring |
| 0.3 | parts potassium sorbate |
| 0.7 | parts phosphoric acid |
| 28.0 | parts water |
| 100.0 | parts total |

After the ingredients were thoroughly mixed, the mixture was placed in an extruder wherein the mixture was heated to about 185° F., and the heated mixture was then extruded into small strands. The small strands of food product were highly acceptable as a simulated scrambled egg.

EXAMPLE 2

Example 1 was repeated except 25 parts by weight egg solids was used, the sugar was reduced by 5 parts, the starch reduced by 5 parts and the protein binding agent reduced by 10 parts. Again, an excellent simulated scrambled egg was produced.

EXAMPLE 3

Example 1 was repeated except the product was divided into 2 portions and a first portion was colored a light yellow with the second portion allowed to remain white. The two portions were then extruded such that a cylinder of the yellow portion was contained in a cylinder of the white portion. These cylinders were then sliced as round discs and gave the appearance of a fried egg. The product was an excellent simulated fried egg.

EXAMPLE 4

Example 2 was repeated with the exception that the product was formed into a fried egg shape disclosed in Example 3. Again an excellent simulated egg was produced.

EXAMPLE 5

Example 1 was repeated except the product was extruded as a single round cylinder and sliced into round discs. Again an excellent simulated egg was prepared.

EXAMPLE 6

Example 2 was repeated except the product was extruded as a round cylinder and sliced into round discs. Again an excellent product was produced.

EXAMPLE 7

Examples 1–6 were repeated except the starch was replaced by 2 parts by weight guar gum, 10 parts by weight whole egg solids, and 6 parts by weight soy flour. Again, an excellent product was produced.

The particular advantages of the product of this invention are numerous. First, the product is shelf stable at room temperature for up to 6 months with substantially full retention of aroma and taste. While some food products have a certain degree of shelf stability, none of them approach the product of this invention for stability with substantial retention of aroma and taste.

Another important advantage of this product is that it is a highly nutritious and high protein containing product which can supply the dietary requirements of humans or pets at a low cost.

Still another important advantage of this product is that it provides the first shelf stable, highly nutritious simulated egg product that does not need to be aseptically canned.

Having fully described my new and unique invention, I claim:

1. A shelf stable, semi-moist, simulated, cooked, egg product comprising:
    a. from about 1 to about 35 percent by weight of egg solids;
    b. from about 5 to about 35 percent by weight of a member selected from the group consisting of sugar, sugar equivalents, and mixtures thereof;
    c. from 1 to 30 percent by weight edible water absorbing hydrocolloid:
    d. from 10 to 30 percent by weight high protein binding agent;
    e. a sufficient amount of at least one edible, food-grade, non-toxic acid or acid salt to adjust the pH to from 4.5 to 6.9;
    f. sufficient antimycotic to prevent mold; and
    g. sufficient water to give a final moisture content of from 20 to 40 percent by weight; and
    h. wherein the total weight percentage of the product is 100 percent and (b), (e), and (f) provide bacteriological stability and shelf stability.
2. A product as in claim 1 wherein:
    1. the cooked product comprises a first portion and a second portion
    2. the first portion is colored yellow and the second portion is colored white
    3. the yellow portion and the white portion are in the shape of separate small strands, and
    4. the said separate strands are in a mixture thereby simulating natural scrambled eggs.
3. A shelf stable, semi-moist, simulated, cooked egg product comprising:
    a. from about 1 to about 35 percent by weight of egg solids;
    b. from about 5 to about 35 percent weight of a member selected from the group consisting of sugar, sugar equivalents, and mixtures thereof;
    c. from 2 to 28 percent by weight water absorbing hydrocolloid;
    d. from 10 to 30 percent by weight of a high protein binding agent;
    e. a sufficient amount of at least one edible, food-grade, non-toxic acid or acid salt to adjust the pH to from 4.5 to 6.9, wherein the acid or acid salt is at least one selected from the group consisting of lactic acid, citric acid, acetic acid, tartaric acid, hydrochloric acid, sulfuric acid, phosphoric acid, and monobasic sodium phosphate;
    f. 0.01 to 0.5 percent by weight antimycotic; and
    g. sufficient water to give a final moisture content of from 20 percent to 40 percent by weight; and
    h. wherein the total weight percentage of the product is 100 percent and (b), (e), and (f) provide bacteriological stability and shelf stability.
4. A product as in claim 3 containing from 1 percent to 7 percent by weight of an edible oil or fat.
5. A product as in claim 3 wherein the water absorbing hydrocolloid is gelatinized starch.
6. A product as in claim 1 wherein:
    1. the cooked product comprises a first portion and a second portion;
    2. the first portion is colored white and in the shape of a rounded disc;
    3. the second portion is colored yellow and positioned as an inner portion of the rounded disc to thereby simulate a natural fried egg.
7. A product as in claim 3 wherein:
    1. the cooked product comprises a first portion and a second portion;
    2. the first portion is colored white and in the shape of a rounded disc;
    3. the second portion is colored yellow and positioned as an inner portion of the rounded disc to thereby simulate a natural fried egg.
8. A product as in claim 3 wherein:
    1. the cooked product comprises a first portion and a second portion;
    2. the first portion is colored yellow and the second portion is colored white;
    3. the yellow portion and the white portion are in the shape of separate small strands; and
    4. the said separate strands are in a mixture to thereby simulate natural scrambled eggs.

* * * * *